United States Patent [19]

Magee

[11] Patent Number: 5,031,660

[45] Date of Patent: Jul. 16, 1991

[54] MOUNTING OF ALARM SWITCHES TO VALVES

[76] Inventor: Anthony J. Magee, 1 Curdies St., East Bentleigh, Victoria 3165, Australia

[21] Appl. No.: 466,267

[22] PCT Filed: Jul. 21, 1989

[86] PCT No.: PCT/AU89/00309

§ 371 Date: Feb. 7, 1990

§ 102(e) Date: Feb. 7, 1990

[87] PCT Pub. No.: WO90/01652

PCT Pub. Date: Feb. 22, 1990

[30] Foreign Application Priority Data

Aug. 4, 1988 [AU] Australia .................. PI9656

[51] Int. Cl.⁵ .................................. F16K 37/00
[52] U.S. Cl. .............................. 137/554; 248/231.4
[58] Field of Search ........................ 137/551, 554; 248/231.4, 221.4

[56] References Cited

U.S. PATENT DOCUMENTS

| 896,864 | 8/1908 | Spamer | 137/554 X |
| 1,952,397 | 3/1934 | Turner | 137/554 |
| 1,990,339 | 2/1935 | Lowe et al. | 137/551 |
| 2,551,157 | 5/1951 | Price | 248/231.4 X |
| 2,920,642 | 1/1960 | Tiefenthaler | 137/554 X |
| 4,301,767 | 11/1981 | Willinger et al. | 248/231.4 X |
| 4,518,008 | 5/1985 | Fenster et al. | 137/554 X |
| 4,665,386 | 5/1987 | Haws | 137/554 X |
| 4,696,325 | 9/1987 | Magee | 137/554 X |

FOREIGN PATENT DOCUMENTS

| 549439 | 3/1986 | Australia . |
| 551017 | 4/1986 | Australia . |
| 587537 | 10/1987 | Australia . |
| 398911 | 3/1966 | Switzerland | 248/231.4 |
| 895957 | 5/1962 | United Kingdom | 137/554 |
| 00970 | 2/1986 | World Int. Prop. O. . |

Primary Examiner—John Rivell
Attorney, Agent, or Firm—Whitham & Marhoefer

[57] ABSTRACT

An alarm switch for a control valve (5) is disclosed which has resilient fingers (37) extending from a casing (1) thereof. The fingers (37) are attachable to a yoke (23) of the valve (5) and resiliently deflect to accommodate for minor variations of yoke widths between different valves (5) and support the casing (1) in a position centrally across said yoke and in alignment with the central longitudinal axis of the valve shaft (3). This, in turn, can permit adjustment of the position of the casing (1) relative to an appropriate sensing initiating means carried by the valve shaft (3). Brackets (45) can be used to hold the casing (1) fixed to the yoke (23) so that when a correct position is obtained the casing (1) can be securely held in that position.

7 Claims, 3 Drawing Sheets

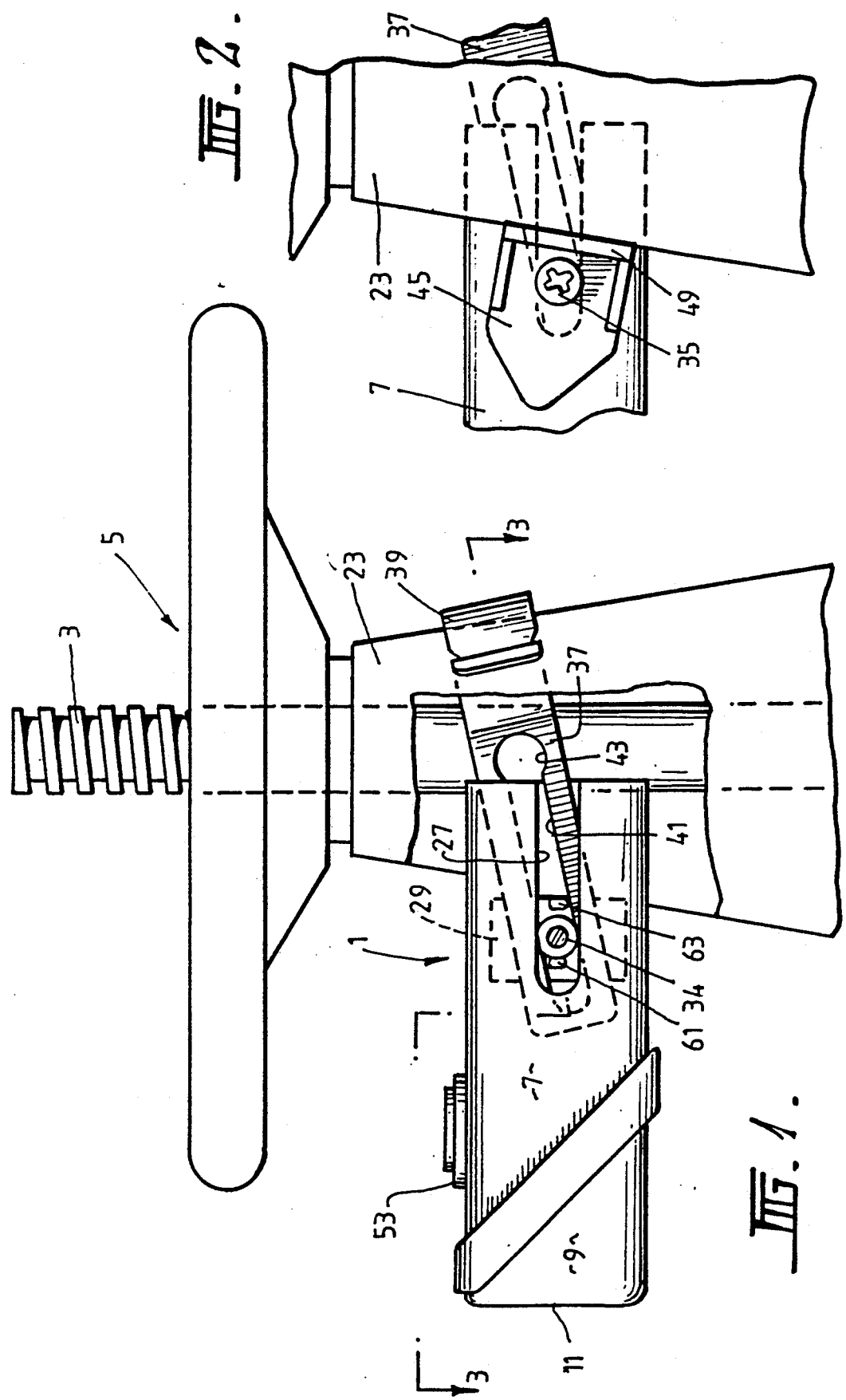

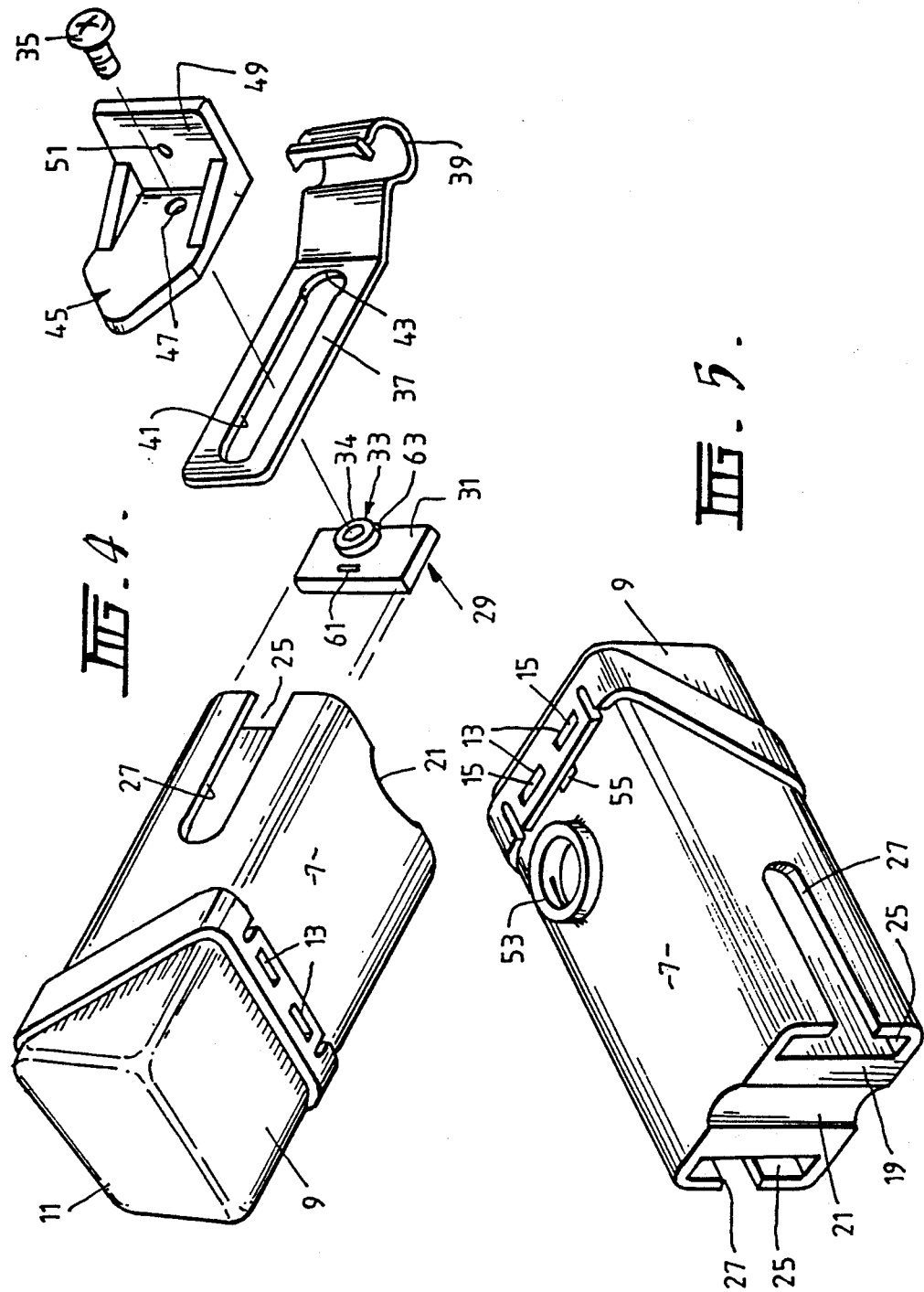

5,031,660

MOUNTING OF ALARM SWITCHES TO VALVES

FIELD OF THE INVENTION

This invention relates to mounting of alarm switches to valves and relates particularly, but not exclusively, to an alarm switch with mounting means and to a method of mounting such a switch to a rising stem type water supply valve so that the alarm switch can monitor the open and/or closed condition of said valve.

DESCRIPTION OF PRIOR ART

I already have patents in Australia relating to alarm switches for water supply valves. I make reference to Australian Standard Patent No. 567,040 and to Australian Petty Patents Nos. 549,439 and 551,017, the subject matter of which is hereby incorporated by reference.

It has been found particularly troublesome to correctly align the alarm switch relative to the valve stem or valve shaft in valves owing to the rather peculiar structure where the spacing apart of the side sections of yokes which support the valve shaft are different between valves. Such yokes are also inclined relative to the central longitudinal axis of the valve shaft. This, in turn, makes for complicated mounting means. The problem is further exacerbated by the fact that the angle of inclination of the sides of the yokes are different between valves made by different manufacturers. Hence, it is generally accepted that a large range of mounting brackets are needed to accommodate mounting of such alarm switches to all valves regardless of manufacturer.

OBJECT AND STATEMENT OF INVENTION

It is therefore an object of the present invention to attempt to provide an alarm switch with mounting means which can reduce, at least to some small degree, the aforementioned problem. A method of mounting such an alarm switch is also within the general object of the invention.

Therefore, according to a first broad aspect of the present invention there may be provided an alarm switch of a type which is externally mountable to a control valve for sensing of the open and/or closed state of said valve, said alarm switch having a casing in which is carried a switch means for providing such sensing when mounted to co-operate with an appropriate sensing initiating means associated with a valve shaft of said valve, said casing having two resilient mounting fingers one on one side and the other on an opposite side, said mounting fingers being mountable to a yoke part of said valve, the resiliency of each finger being such that the fingers will resiliently deflect to accommodate for minor variations of yoke widths so that said casing will be centrally disposed across said yoke and in alignment with the central axis of the valve shaft of said valve.

According to a further broad aspect of the present invention there may be provided a method of mounting an alarm switch to a fluid supply valve for sensing the open and/or closed state of said valve, said alarm switch being contained within a casing, said method comprising:

(a) attaching one resilient finger to one side of a yoke of said valve, (b) attaching a second resilient finger to an opposite side yoke of said valve so that a valve shaft of said valve is centrally between the fingers, (c) attaching each of the fingers to respective opposite sides of said casing so said casing will be centrally disposed across said yoke and in alignment with the central axis of said valve shaft, said resilient fingers being resiliently deflected when said casing is so disposed, the resiliency being sufficient to accommodate for minor variations in yoke widths.

The order of attachment of the fingers to the yokes and to the casing may be reversed and this is to be understood to be within the scope of the invention.

Most preferably the fingers are attached to the casing by position adjusting attachment means so that by appropriate adjustment thereof, the casing can be attached correctly relative to said valve shaft whereby to accommodate for minor variations in yoke widths in valves.

Most preferably there are provided two mounting brackets which can then be attached to said casing—one on each side—and to said yoke to securely fasten and hold said casing in a correct operational position relative to said shaft.

BRIEF DESCRIPTION OF DRAWINGS

In order that the invention can be more clearly ascertained, an example of a particularly preferred embodiment for use on a rising stem water supply valve will now be described with reference to the accompanying drawings, wherein:

FIG. 1 is a close-up side, partly broken away, view of an upper yoke part of a rising stem water supply valve showing how the preferred alarm switch and its casing are positioned relative to the valve shaft;

FIG. 2 is a close-up view similar to that of FIG. 1 where the broken away portion is shown in full and showing how a mounting bracket is disposed;

FIG. 4 is an exploded perspective view showing the various components used for mounting of the alarm switch and its casing relative to the yoke of the valve;

FIG. 5 is a front perspective view of the casing of the alarm switch; and

DETAILED DESCRIPTION OF PREFERRED EMBODIMENTS

Figure 3:
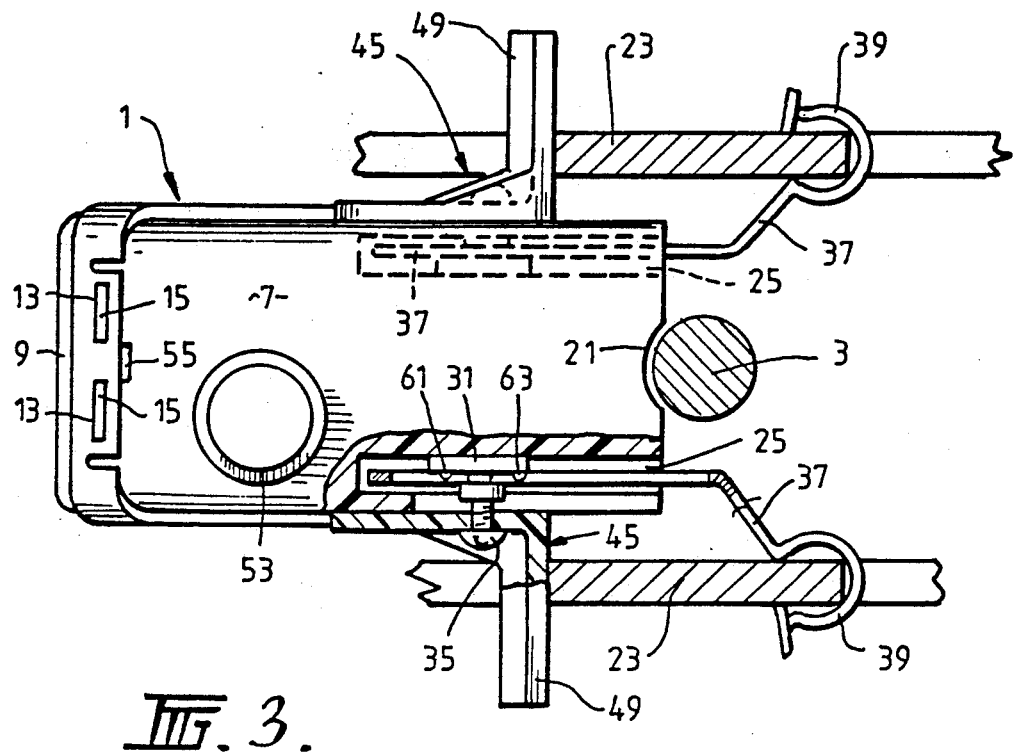
FIG. 3 is a sectional view along line 3—3 of FIG. 1.

Reference should now be made to the aforementioned Australian standard patent specification and the aforementioned Australian petty patent specifications for an understanding of the general concept of an alarm switch. In a rising stem valve it is normal for the alarm switch to appropriately co-operate with the valve shaft in order to sense if the valve is open or closed. This may be achieved by providing a drilled hole transversely into the valve shaft at an appropriate position and placing appropriate magnetic material in the hole. In such case the alarm switch contains a magnetically operable sensor which senses the presence of the appropriate magnetic material. Other variations of alarm switch work by having a switch such as a microswitch co-operate with an opening and/or a projection on the valve shaft. In such instances, the microswitch is caused to trip to change its state when the valve shaft is moved and as a result of the opening and/or projection coacting with the microswitch.

In all types of alarm switches, the mounting of the casing in a correct operational position relative to the valve shaft is critical.

Therefore, the present embodiment of the invention provides a means for accomplishing mounting of the casing of the alarm switch in a substantially correct operational position relatively easily whereby to accommodate for minor variations in yoke widths between valves. In this way it is possible to provide an alarm switch and a casing therefor with mounting means which will enable the alarm switch and its casing to be substantially correctly positioned relative to the central axis of the valve shaft for a wide range of different valves. Thus, it will not be necessary to carry particular mounting brackets for each type of valve.

Referring now to all of the figures in the drawings it can be seen that there is provided a casing 1 in which the alarm switch can be contained. The alarm switch and its associated circuitry have not been shown in the drawings as these are not critical to the present invention. The alarm switch may comprise magnetically operable switches, proximity switches and/or microswitches or any other form of switch suitable for co-operating with the valve shaft 3 of a valve 5 or a part carried by the valve shaft, so as to sense when the valve is open and/or closed. In the preferred embodiment they comprise magnetically operable switches.

Figure 6:
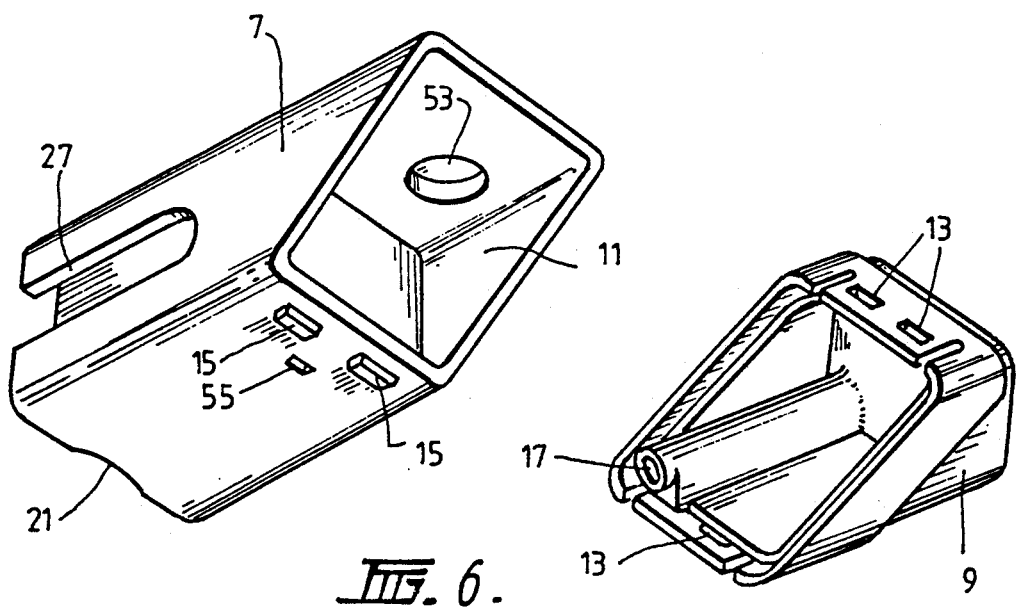
FIG. 6 is an underneath rear perspective view of the casing shown in FIG. 5 where a lid has been removed.

The casing 1 comprises a main body 7 and a lid 9. The body part 7 has an upper angularly inclined opening 11 (see FIG. 6) to permit easy access to the interior of the casing 1 to facilitate easy connection to electrical terminals for the alarm switch. The lid 9 has a correspondingly inclined lid portion which is provided to snap lock engage over the base 7. This is shown particularly in FIG. 6. In this connection the lid 9 has four cut-outs 13 therein which snap lock engage over four projections 15, only two of which are shown in FIG. 6. Thus, the lid 9 can be secured to the base 7. Appropriate magnetic material can be mounted within an elongate recess 17 in the lid 9 to co-operate with a magnetic sensor within the alarm switch mounted within the body 7. Thus, if the lid 9 is removed the alarm switch will indicate an alarm condition. This provides for tamper-proof mounting of the lid 9 relative to the body 7. The body 7 of the casing 1 has a forward end 19 with a centrally located arcuate cut-out 21. The forward end 19 is disposed, in use, towards the valve shaft 3 so that the arcuate cut-out 21 partly receives the valve shaft 3 therein. This, in turn, will provide for substantially correct location of the casing 1 relative to the central axis of the valve shaft 3 so the alarm switch therein can correctly co-operate with the valve shaft 3. In other words, the cut-out 21 locates the casing 1 centrally across a yoke 23 of the valve 5. This is clearly shown in FIG. 3.

At each side of the casing 1 there is provided a recess 25 which is open from the forward end 19. The recesses 25 are clearly shown only in FIGS. 4, 5 and 6. An elongate slot 27 is provided on each side of the casing 1 and provides a communication with the respective recess 25 at each side.

Each of the recesses 25 and slots 27 is provided to respectively receive position adjusting means 29 (shown most clearly in FIG. 4). As can be seen, the position adjusting means 29 comprise a rectangular shaped nut 31 with a centrally disposed upstanding boss 33. The nut 31 is provided for sliding in the recess 25 whilst the boss 33 is provided for sliding within the elongate slot 27. The position adjusting means 29 carries a screw-threaded bolt 35 which is screw-threaded into the nut 31.

A pair of resilient fingers 37 are provided so that one can be fastened to one side of the casing 1 and the other to the other side of the casing 1 to extend from the forward end 19. As can be seen in FIG. 4, the fingers are elongate and have a forward clip 39 formed integrally therewith. The forward clip 39 is provided for, in use, clipping over one side edge of the yoke 23. This is shown in FIGS. 1 and 3. The resilient fingers 37 have an elongate slot 41 of a width just slightly smaller than the diameter of the boss 33 so that they can be carried under a head 34 of the boss 33. A cut-out 43 is provided in the finger 37 which communicates with the slot 41 so as to enable easy passing of the head of the bolt 35 through the slot 41 as well as for the easy passing of the head 34 of the boss 33 through the slot 41.

When the position adjusting means 29 is positioned within the recesses 25 and the respective fingers 37 fastened thereto, the boss 33 can be slid along the slots 41 in a frictional manner whereby to hold the fingers 37 at a partly secured position extending forwardly of the forward end 19 but within the recesses 25 as shown in FIGS. 1 and 3.

In order to mount the casing 1 relative to the yoke 23, the casing 1 with the forwarding extending resilient fingers 37 is then placed between the sides of the yoke 23 and in approximate alignment with the valve shaft 3. The forward clips 39 are then clipped over the sides of the yokes 23, as shown in FIG. 3, so that the casing 1 will be held in a substantially central position so that the arcuate cut-out 21 is located centrally with the axis of the valve shaft 3. The resilient fingers 37 can be deflected somewhat, if needed, to accommodate for the width of the yoke 23. The resilient fingers 37 and the casing 1 can then be slid up and down the yoke 23 to an appropriate position to align with the appropriate means on the valve shaft to initiate the necessary sensing. When the correct position is found, then the nature of the fingers 37 and the forward clips 39 is such that it will hold the casing 1 in the required position.

It is noted that in order to establish a final correct position for the casing 1 the casing 1 may be required to be angularly rotated relative to the longitudinal extent of the fingers 37 and that it may be required to be moved in and out relative to its elongate slots 27 and/or the slots 41 in the fingers 39. The position adjusting means 29 will enable this to occur.

To securely hold the casing 1 in the correct position there are provided two mounting brackets 45. One mounting bracket 45 is mounted on one side of the casing and the other is mounted on the other side so that the respective bolts 35 pass through respective openings 47 therein to attach the brackets 45 relative to the casing 1. It is required that the base 49 of the mounting brackets 45 locate against the edge surface of each yoke 23. This is clearly shown in FIG. 2. A hole 51 (see FIG. 4) can then be drilled through the base 49 and into the sides of the yokes 23 and a locking drive pin (not shown) inserted through the holes 51 to lock each of the respective mounting brackets 45 to the yokes 23. This, in turn, will securely lock and hold the casing 1 to the yokes 23 and if the initial adjustment has been made correctly, it will positively hold the casing 1 in the correct operational position.

Thus, it can be seen that with the above arrangement it is possible to provide for mounting of the casing 1 to valves to accommodate for minor variations in widths of the yokes 23. This is because the resilient fingers 37 can be flexed to accommodate for such minor variations in widths.

If the angle of inclination of the yokes 23 is different between valves then the mounting means 29 will still permit the casing 1 to be properly positioned.

FIG. 1 and FIG. 4 show that the position adjusting means 29 has two upstanding pips 61 and 63 thereon, each on the face which will abut with the face of the resilient fingers 37. Pip 61 is positioned immediately to the side of boss 33 whilst pip 63 is positioned on the opposite side of boss 33 at the edge of the nut 31. In use, the position adjusting means 29 is slid to the end of slot 41 remote from the clip 39. The pip 61 then engages with the end face of the resilient fingers 37 and causes the head 34 to tightly engaging with the resilient fingers 37 to frictionally hold the position adjusting means 29 at that position during initial assembly to the casing 1. This, in turn, allows the fingers 37 to project a maximum distance from the recess 25 for initial fitting to the valve 5. Should the position adjusting means fall to the other end of the slot 41, pip 63, being taller than pip 61, will engage with the bottom edge of cut-out 43 and prevent the head 34 of the boss 33 from passing into the cut-out 43, and thus permitting the position adjusting means 29 to fall away from the finger 37.

The actual alarm switch can be mounted on a printed circuit board which can be arranged to slide fit within the base 7 and then be back-filled with a suitable epoxy resin. A threaded opening 53 may be provided to permit conduit to be fastened to the casing 1 to contain wiring to the switch circuit therein. If desired, the lid may be completely filled with a sealastic or other suitable water-proofing material prior to fastening to the base 7 so as to inhibit ingress of water which may otherwise electrically short the terminations made to the alarm switch therein. If desired, a recess 55 (see FIG. 6) may be provided on the casing in which may be located a LED which can give a visual indication at the alarm switch casing 1 of an alarm condition being present or alternatively that the alarm switch is in an activated state ready for sensing an alarm condition.

The casing may be made from a suitable plastics material but other suitable materials such as of metal or resins are not excluded. Typically the fingers 37 are made from a resilient steel but other resilient materials such as plastics or the like are not to be excluded.

When a magnetic reed switch is used and the switch and appropriate magnetic material such as a permanent magnet is carried by the valve shaft 3, the arcuate cut-out 21 may be moulded with thin webs or pips (not shown) which project say 1 mm from the arcuate face thereof. Thus, by pressing the casing 1 hard against the valve shaft 3, it will correctly space the casing a predetermined distance, in this case 1 mm, from the valve shaft. The thin webs or pips can then wear away as the valve is used, as by frictional wear, without unduly affecting operation of the valve.

In the preferred embodiment herein it is preferred that the fingers 37 be attached to the casing 1 prior to the fingers 37 being attached to the yoke 23. The reverse procedure where the fingers 37 are attached to the yoke 23 and then to the casing 1 is also possible and is to be considered within the scope of the invention.

Modifications may be made to the present invention as would be apparent to persons skilled in the alarm switch sensing art without departing from the ambit of the invention, the nature of which is to be determined from the foregoing description.

I claim:

1. An alarm switch of a type which is externally mountable to a control valve for sensing of the open and/or closed state of said valve, said alarm switch having a casing in which is carried a switch means for providing such sensing when mounting to co-operate with an appropriate sensing initiating means associated with a valve shaft of said valve, said casing having two resilient mounting fingers one on one side and the other on an opposite side, said mounting fingers being mountable to a yoke part of said valve, the resiliency of each finger being such that the fingers will resiliently deflect to accommodate for minor variations of yoke widths so that said casing will be centrally disposed across said yoke and in alignment with the central longitudinal axis of the valve shaft of said valve, and mounting bracket means, attached to said casing and located against said yoke, to securely fasten and hold said casing in a correct operational positional relative to said appropriate sensing initiating means.

2. An alarm switch as claimed in claim 1 wherein said fingers are attached to said casing by position adjustment attachment means so that by appropriate adjustment the casing can be moved in and out relative to said valve shaft whereby to be correctly operatively positioned to said appropriate sensing initiating means.

3. An alarm switch as claimed in claim 2 wherein said position adjustment attachment means will permit said casing to be angularly inclined relative to said fingers whereby to correctly operatively position said casing relative to said appropriate sensing initiating means.

4. An alarm switch as claimed in claim 1 wherein said resilient mounting fingers have clip means for permitting clipping to said yoke.

5. An alarm switch as claimed in claim 1, wherein said mounting bracket means is attached to said yoke.

6. A method of mounting an alarm switch to a fluid supply valve for sensing the open and/or closed state of said valve, said alarm switch being contained within a casing, said method comprising:
(a) attaching one resilient finger to one side of a yoke of said valve,
(b) attaching a second resilient finger to an opposite side of said yoke of said valve so that a valve shaft of said valve is centrally between the fingers,
(c) attaching each of the fingers to respective opposite sides of said casing so said casing will be correctly operatively positioned relative to an appropriate sensing initiating means associated with said valve shaft and be centrally disposed across said yoke and in alignment with the central longitudinal axis of said valve shaft, said resilient fingers being resiliently deflected when said casing is so disposed, the resiliency being sufficient to accommodate for minor variations in yoke widths, and
(d) attaching at least one mounting bracket to said casing and located against said yoke to securely fasten and hold said casing in the correct position relative to said valve shaft.

7. A method of mounting an alarm switch as claimed in claim 6, including the further step of attaching said at least one mounting bracket to said yoke.

* * * * *